United States Patent Office 3,694,230
Patented Sept. 26, 1972

3,694,230
CO-MILLING PROCESS FOR MAKING CULINARY MIXES
Robert R. Cooke, Evendale, Ohio, assignor to The Procter & Gamble Company, Cincinnati, Ohio
No Drawing. Continuation of application Ser. No. 759,795, Sept. 13, 1968, and continuation-in-part of application Ser. No. 676,740, Oct. 20, 1967.
This application Sept. 17, 1970, Ser. No. 73,173
Int. Cl. A23l *1/10*
U.S. Cl. 99—94
5 Claims

ABSTRACT OF THE DISCLOSURE

Dry, prepared culinary mixes are made by a process which involves co-milling sugar and flour in a multi-impact mill.

---

This application is a continuation-in-part of application Ser. No. 676,740, filed Oct. 20, 1967 now abandoned.

BACKGROUND OF THE INVENTION

This invention relates to processing of dry prepared culinary mixes, particularly layer cake mixes.

So-called "dry" prepared mixes used for baking are made by combining sugar, flour, shortening, and other ingredients including leavening, milk solids, egg solids, flavoring, and coloring, to form a smooth free-flowing granular mixture. To prepare these dry mixes for baking, liquid materials such as water, milk, and eggs are added, and the combination is beaten to form a homogeneous mixture and to incorporate air. The resulting batter is then baked.

It is known that the method by which the various ingredients in such culinary mixes are combined can affect the properties of the cake or other end product. For example, in the processing of a leading brand of commercially available layer cake mix, a homogeneous blend of sugar, flour and shortening is subjected to simultaneous shearing and crushing forces by passing said blend through a roll mill prior to the addition of the minor ingredients. This roll-milling operation, which is described in detail in U.S. Pats. 2,874,051, -052, and -053 (Feb. 17, 1959), imparts superior properties to products prepared from mixes processed in this manner. For example, culinary products such as cakes prepared from mixes processed by the roll-milling technique described in the aforesaid patents are generally considered to be superior to cakes prepared from mixes processed by conventional methods in areas such as ease of preparation, volume, grain, general appearance, structure, and eating quality. The conventional techniques referred to above generally involve simply mixing the ingredients in a paddle mixer or ribbon blender followed by hammer-milling or mild impact grinding to eliminate lumps and to form the desired granular mixture.

Irrespective of the advantages obtained by roll-milling sugar, flour, and shortening as a step in the processing of dry prepared culinary mixes, this operation does have certain inherent deficiencies. For example, roll mills are expensive and bulky pieces of equipment and require constant attention by skilled operators. The work input to the material being processed in terms of total energy or power expended is very low with roll mills, i.e., they are relatively inefficient. Also, the simultaneous mixing of sugar, flour, and shortening required by the roll-milling methods restricts the degree of freedom available to control or modify the overall process as compared, for instance, to a method wherein the sugar and flour are mixed together in one step and shortening is then added in a later step. All in all, however, the advantages gained by the aforesaid roll-milling method have been deemed to outweigh any disadvantages inherent therein and said method has enjoyed a high level of commercial success.

SUMMARY OF THE INVENTION

Briefly stated, this invention involves the discovery of a novel method of processing dry prepared culinary mixes which provides the same advantages as the above-described roll-milling technique without several of the disadvantages inherent therein. In general, the present invention relates to a process of co-milling sugar and flour in a multi-impact mill, followed by the subsequent addition of shortening and other ingredients as a method of processing dry prepared culinary mixes. The essential characteristic of the present invention is the fact that sugar and flour are milled together in a multi-impact mill.

As more specific summary, this invention provides a process for preparing a dry prepared culinary mix, which comprises: passing crystalline sugar and flour through a multi-impact mill to form a co-milled mixture comprising finely ground sugar, flour and combined sugar-flour particles, and adding shortening to the co-milled mixture.

DESCRIPTION OF THE PREFERRED EMBODIMENTS

As mentioned above, the essence of the present invention involves the passing of flour and sugar together through a multi-impact mill, i.e., multi-impact milling. This milling is joint milling and mixing of sugar and flour, is separate from any treatment of other ingredients, and is referred to hereinafter as "co-milling."

It is very important that the co-milling process of this invention take place in a multi-impact mill. A multi-impact mill of the type useful for the present invention is a specific type of apparatus characterized by the extreme comminution and co-action it imparts to particles being treated without the use of metal-to-metal contact and/or liquid carriers or lubricants.

There are several basic types of devices used for fine grinding of materials such as sugar or flour. These devices are often referred to as "mills" and can generally be classified into four groups:

(1) Mills which employ crushing and shearing forces between two hard surfaces. Examples are roll mills and ball mills.

(2) Mills which employ a screen, grid or grating through which the material to be ground is forced. Most hammermills are exemplary of this type of mill.

(3) Mills which employ a suspension of the material to be ground in a liquid such as water or oil. Examples are "attritors" and some types of roller mills.

(4) Impact mills wherein the material to be ground is reduced in size by striking a hard surface which can be a rotating member of the device, a stationary member of the device, another particle of the material being treated, and/or mixtures of these three types of "impacts." Impact mills can further be classified into two sub-types as follows:

(a) "One-pass" impact mills where there is no internal provision for recirculating oversized material or grinding it in several internal stages, and where there is little or no co-action between the particles being treated;

(b) Multi-pass impact mills which employ an internal particle size classifier to return oversize material for further grinding, or which subject the material to be treated to repeated grinding actions in several internal stages. These multi-impact mills involve a substantial co-action between particles of the material being treated.

Of all the above-described grinding devices, only the multi-impact mills defined under 4(b) are useful for co-milling sugar and flour in accordance with the present invention.

The type of milling devices that employ surface-to-surface contact, e.g., Type (1) and Type (2) mills, tend to crack or rupture starch granules of the flour. Such damaged starch granules are unable to swell normally and form a normal gel and this in turn is detrimental to flour performance in cakes. The above-described roll milling practice of U.S. Pats. 2,874,051, -052 and -053 avoids this problem because of the presence of shortening in the mixture being milled which apparently lubricates or otherwise protects the starch granules from damage by the rollers.

The type of milling devices that employ suspensions of material in a liquid, e.g., Type (2) mills, are also unsuitable for the co-milling of sugar and flour. A water suspension would dissolve the sugar and an oil suspension would tend to oil-wet the flour particles which would interfere with flour performance in the batter mixing and baking stages of cake preparation.

The type of impact milling devices which generally involve one pass of the material being treated, e.g., Type 4(a) mills, are likewise not suitable for the co-milling process of the present invention. Conventional one-pass impact grinding devices, examples of which are described in U.S. Pats. 2,339,737 and 2,651,470, are often referred to as "entoleters." Such a device generally comprises two parallel horizontal discs spaced apart by interconnecting pins or blades arranged in one or two cylindrical planes extending at right angles to the surfaces of the discs. An external shell encloses the discs. Material to be treated is passed through a hole in the center of the top disc while the discs are revolving at a high rate of speed. Centrifugal force impacts the material against the pins and thence against the external shell, thereby breaking up large particles. The broken-up material is passed out through an outlet at the bottom of the device. These machines are very useful for limited size reduction of particles and/or for breaking up agglomerates. However, as a particle progresses from the inlet or the center of the machine to the periphery of the machine, there is essentially only one or two impacts (as the particle passes through the plane of the pins) and perhaps one additional impact (as the particle strikes the external shell). Thus, the amount of size reduction that can be accomplished in such a one-pass mill is limited and is insufficient for the present invention. More importantly, little or no co-action between particles is achieved in this type of device because of the limited number of impacts and the substantially direct path taken by the particles as they pass through the device. As indicated hereinbefore, co-action between sugar and flour particles is one of the characterizing features of the co-milling process of the present invention. Co-action refers to impacts of particles against each other and particularly impacts of sugar particles with flour particles.

On the other hand, the multi-impact mills, e.g., Type 4(b) mills, which are useful for the present invention involve multiple impacts for any given particle and also involve co-action between particles. Air or a similar gas is used to suspend and transport the particles being treated within the mill.

In one specific type of useful multi-impact mill, the multiple-impact effect is achieved by utilizing an impact zone and a classifying zone. Fine or properly-sized particles are discharged from the classifying zone and coarse or oversized particles are recycled to the impact zone. This type of mill can therefore be termed a multi-pass impact mill. Examples of useful multi-pass impact mills are described in the following references: U.S. Pat. 3,184,-172; U.S. Pat. 3,082,962, "Bulletin 094," published by The Sturtevant Mill Company, Boston, Massachusetts; "Bulletin No. 6405," published by the American Manufacturing Company, New Haven, Connecticut; "Bulletin G–4–C," published by the Bauer Bros. Co., Springfield, Ohio; and "Bulletin ACM–1," published by Slick Industrial Company, Summit, N.J. The multi-pass impact mills disclosed in the above-cited references all involve high speed impact of particles with hard surfaces in an impact zone and internal classification whereby oversize particles are returned to the impact zone in such a manner that co-action between particles is achieved. Thus, co-milling in a multi-pass mill comprises size reducing crystalline sugar and flour in an impact zone and recycling oversized particles to the impact zone whereby particles impact with each other.

A specific preferred multi-pass impact mill is known as a vertical air-swept impact mill. In this mill, sugar and flour particles are fed to the bottom of a cylindrical-shaped housing containing a vertical rotating shaft. Vanes on the shaft create a whirling vertical air flow and revolving impactors on the shaft crush the sugar and flour particles against the housing walls as the air flow causes the particles to pass upward through the impact zone. Above the impact zone, an exhaust fan pulls fines upward through revolving centrifugal selector arms while deflector walls cause large particles to return downward to the impact zone where they co-act with the upward flowing input particles.

In another type of useful multi-pass impact mill, the impact of one particle against another is utilized to accomplish essentially all of the required size reduction and co-action; the mill per se serves mainly to contain, direct and control high velocity air streams which transport the particles. Such mills are sometimes referred to as "jet mills." Examples of useful jet mills are described in "Bulletin M–463," published by Majac, Inc., Pittsburgh, Pa., and in a pamphlet entitled "Jet Mills for Your Products," published by Fluid Energy Processing and Equipment Company, Lansdale, Pa.

In a second specific type of multi-impact mill, the multiple impact effect is achieved by utilizing an impact zone comprised of successive stages. For example, the particles can be passed on a tortuous path through rows of intermeshing (but not touching) studs or pins provided on a stationary and a rotatable disc or the material can be passed through a series of propeller-type projections attached to a single shaft rotating at high speed. This type of impact mill can thus be termed a multi-stage impact mill and is preferable for use in this invention. Such mills inherently involve internal recycling and co-action of particles in the impact zone due to the difficulty experienced by the particles in passing from one stage to the next. Examples of useful multistage impact mills are disclosed in U.S. Pat. 2,752,097, 2,875,956, and 3,067,959. Thus, co-milling in a multi-stage impact mill comprises size-reducing crystalline sugar and flour in an impact zone of successive stages whereby particles impact with each other.

A preferred multi-stage impact mill for use in the present invention is known as a sieveless impact stud mill and is described in a pamphlet entitled "Kolloplex," published by Alpine Aktiengesellschaft, Augsburg, Germany. This mill utilizes two coaxially-mounted discs having an array of studs in circumferential rows projecting therefrom and interspaced between the two discs. One disc is stationary while the other rotates at high speeds, e.g., 5,000–15,000 r.p.m.'s. The particles to be treated are released into the center of the discs and are forced to the periphery thereof by centrifugal force. Size reduction and coaction is achieved by the interaction of particles with each other and with the studs as the material passes on its tortuous path through the rows of interspaced studs provided on the stationary and the rotatable disc. Each row of studs represents a stage. A similar sieveless impact stud mill and also a preferred multi-stage impact mill for use herein is disclosed in U.S. Pat. 2,712,416, and in a pamphlet entitled "Contraplex" published by Alpine Aktiengesellschaft, Augsburg, Germany. In this particular mill, both of the discs revolve, preferably at different speeds or in different directions to each other.

Preferably, sieveless impact stud mills of the type described above have the following characteristics: Diameter of discs, 4 inches to 40 inches; diameter of studs, 0.1 inch to 0.4 inch; length of studs, 0.5 inch to 2.0 inches; number of studs per disc, 30 to 300; rows of studs per disc, 2 to 10; speed of rotating disc, 1,000 r.p.m. to 18,000 r.p.m.; speed of second rotating disc (if so equipped), 500 r.p.m. to 10,000 r.p.m.

In accordance with the disclosure set forth above, the term "multi-impact mill," as used herein, defines multipass and multi-stage mills wherein size reduction and coaction of sugar and flour particles are accomplished by impact of particles with hard surfaces and/or with each other without undue damage to the starch portion of the flour and without the use of metal to metal contact or liquid suspensions.

The crystalline sugar and flour that are co-milled in this invention are conventional ingredients in normal form. Thus, prior to the co-milling operation, the sugar particles generally have particle diameters ranging from about $40\mu$ to about $2000\mu$ and a mean particle diameter within the range of from about $250\mu$ to about $750\mu$, and the flour particles generally have particle diameters ranging from about $1\mu$ to about $175\mu$ and a mean particle diameter within the range of from about $15\mu$ to about $65\mu$.

One of the characterizing effects of the co-milling is to cause combined sugar-flour particles to form along with size-reduced sugar particles per se and size-reduced flour particles per se, all of said particles being finely ground. Hence, the co-milled sugar-flour mixture obtained from, for example, an approximately equal amount of sugar and flour (a sugar/flour ratio within the range of from about 0.9:1 to about 1.2:1), generally comprises from about 30% to about 60% sugar particles having particle diameters ranging from about $1\mu$ to about $150\mu$ and preferably having a mean particle diameter within the range of from about $10\mu$ to about $30\mu$, from about 10% to about 40% flour particles having particle diameters ranging from about $1\mu$ to about $120\mu$ and preferably having a mean particle diameter within the range of from about $10\mu$ to about $30\mu$, and from about 10% to about 50% combined sugar-flour particles having particle diameters ranging from about $5\mu$ to about $150\mu$ and preferably having a mean particle diameter within the range of from about $10\mu$ to about $40\mu$. Adjustments in the proportions of sugar and flour in the original mixture accordingly cause the specified percentages to vary. Irrespective of starting proportions of sugar and flour, preferably at least 5% and most preferably from about 20% to about 60%, of the co-milled mixture is comprised of combined sugar-flour particles.

The term "combined sugar-flour particle" refers to a particle comprising individual sugar and flour particles, retaining their individual identity, and physically bonded to one another. For example, a combined sugar-flour particle can contain one flour particle attached to one sugar particle or can contain several flour particles bonded to several sugar particles. Any diameter specified herein for a combined sugar-flour particle refers to the entire combined particle and not to just the sugar or flour portion thereof.

A particularly preferred co-milled mixture comprises sugar particles having particle diameters ranging from about $2\mu$ to about $60\mu$ and preferably having a mean particle diameter of about $15\mu$, flour particles having particle diameters ranging from about $2\mu$ to about $40\mu$ and preferably having a mean particle diameter of about $12\mu$ and combined sugar-flour particles having particle diameters ranging from about $10\mu$ to about $80\mu$ and preferably having a mean particle diameter of about $25\mu$.

The percentage of sugar, flour, and sugar-flour particles specified herein are not by weight or volume but are based on actual numerical count of particles as determined by visual examination of photomicrographs. The particle sizes specified are also based on visual examination of photomicrographs. All other percentages and ratios specified herein are by weight.

Although dependent on such variables as the size and type of multi-impact mill used, a desirable flow rate through the mill is within the range of from about 5 pounds to about 200 pounds, preferably from about 10 pounds to about 150 pounds, of material being processed per hour per horsepower of the mill. The power of the mill can in turn range from about 1 to about 125; preferably from about 10 to about 75 horsepower.

The total work input is also governed to some extent by the specific mill and conditions employed. However, a total work input to the mill within the range of from about 1 to about 50 watt hours per pound of material has been generally found to be desirable. Preferably, the total work input to the mill should be within the range of from about 2 to about 12 watt hours per pound.

The above-described co-milling operation comprises the initial and essential step in forming the dry prepared culinary mixes of the present invention. After the co-milling, the shortening and other ingredients, if any, of the mix can be combined with the co-milled sugar-flour mixture in a conventional manner. For example, the shortening and other ingredients can be combined with the co-milled sugar-flour mixture by admixing these components in a planetary bowl mixer, a ribbon blender, a high speed rotary mixer, or in other conventional mixers.

Preferably, however, the shortening is first mixed with the co-milled sugar-flour mixture, for example, in a paddle mixer, a ribbon blender or a high speed rotary mixer, to form an essentially homogeneous sugar-flour-shortening blend, and then the additional ingredients are admixed (also in any conventional mixer) with this blend.

A very effective technique for insuring formation of the desired homogeneous blend of sugar, flour and shortening is to uniformly mix shortening into the co-milled sugar-flour mixture, e.g., in a ribbon blender, and then to pass the ingredients so mixed through a two or four-roll mill, preferably at a work input of from about 1 to about 15 watt hours per pound. A convenient manner of adding shortening to the co-milled sugar-flour mixture is to add supercooled liquid shortening according to the teachings of Johnson, U.S.P. Re. 23,484. If desired, the shortening can be sprayed, e.g., through a nozzle, into the co-milled mixture. Conventional mild impact grinding to break up any lumps or agglomerates is desirable as a final processing step.

Thus, in partial summary, this invention basically involves the co-milling of sugar and flour in a multi-impact mill and the subsequent addition of shortening to the co-milled mixture as a novel method of processing dry prepared culinary mixes. In more specific embodiments, the invention involves the co-milling step combined with the subsequent steps of adding shortening and the other ingredients together to the co-milled sugar-flour mixture. In a preferred embodiment, the shortening individually (to the exclusion of any additional ingredients) is admixed with the co-milled sugar-flour mixture to form an essentially homogeneous blend of sugar, flour and shortening, and then the additional ingredients, if any, are admixed with this homogeneous blend. In any event, the sugar and flour are always co-milled together and the shortening is added subsequently. It is not generally desirable to co-mill sugar, flour, and shortening together because at the multi-impact conditions required by the process of this invention shortening tends to clog or otherwise impair the operation of a multi-impact mill.

The culinary mixes which can be prepared utilizing the co-milling method of this invention are generally conventional in composition. They must contain shortening as well as the co-milled sugar-flour. Additional ingredients such as milk solids, hydrophilic colloids such as carboxymethyl cellulose, leavening and flavoring are added in varying amounts to provide the specific type of product desired.

Flour customarily used in prepared mixes is soft cake flour, preferably containing at least 50% wheat flour. Small proportions, e.g., up to about 10% of the flour, can be of the high protein variety. In some cases, part or all of the flour can be replaced by starch.

Suitable sugars include any of the commonly used granular sugars such as sucrose, dextrose, maltose, fructose, lactose and brown and invert sugars. The sugar should be in crystalline, e.g., solid, particulate, amorphous or glass (rather than liquid form) and mixtures of more than one type of sugar can be used.

The ratio of sugar to flour within the range of from about 0.2:1 to about 1.5:1 is desirable. A sugar-flour ratio in excess of 1:1 has long been known to result in particularly good cakes which are often referred to as "high-ratio." Cakes in which the ratio of sugar to flour is less than 1:1 are generally referred to as "low-ratio" cakes and mixes therefor can also be advantageously made by the co-milling process of this invention.

The shortenings which can be employed in the culinary mix systems processed by this invention include solid or plastic as well as liquid or semi-fluid glyceride shortenings derived from animal, vegetable or marine fats and oils including synthetically prepared shortenings. These glycerides can contain saturated or unsaturated "long-chain" acyl radicals having from about 12 to about 22 carbon atoms such as lauroyl, lauroyleoyl, myristoyl, myristoleoyl, palmitoyl, palmitoleoyl, stearoyl, oleoyl, linoleoyl, linolenoyl, arachidonoyl, behenoyl, erucoyl and the like and are generally obtained from edible oils and fats such as cottonseed oils, soybean oil, coconut oil, rapeseed oil, peanut oil, olive oil, palm oil, palm kernel oils, sunflower seed oil, wallflower oil, menhaden, herring, whale, pilchard oil, lard, tallow and the like. These glycerides can also contain in part one or two short-chain acyl groups having from 2 to about 6 carbon atoms such as acetyl, propanoyl, butanoyl, valeryl, and caproyl; they can be prepared by random or low-temperature inter-esterification reactions of fatty triglyceride-containing oils and fats such as interesterified or rearranged cottonseed oil and lard; and they can be otherwise formed by various organic syntheses.

Preferably, the shortening should be of the so-called emulsified variety, containing up to 50%, and more normally about 5%–25%, by weight of one or more suitable emulsifiers. The partially esterified polyhydric compounds having surface active properties are examples of appropriate emulsifiers. This class of emulsifiers includes, among others, mono- and diglycerides of fatty acids such as monostearin, monopalmitin or rapeseed monoglyceride; partial fatty acid esters of glycols, such as propylene glycol monostearate and monobehenate; higher fatty acid esters of sugars, such as the partial palmitic and oleic esters of sucrose; and phosphoric and sulfuric acid esters such as dodecyl glyceryl ether sulfate and monostearin phosphate. Other examples are the partial esters of hydroxy carboxylic acids, such as lactic, citric, and tartaric acids, with polyhydric compounds, for example, glyceryl lactopalmitate, and the polyoxyethylene ethers of fatty esters of polyhydric alcohols, such as a polyoxyethylene ether of sorbitan monostearate or distearate. Fatty acids alone or esterified with a hydroxy carboxylic acid, e.g., stearyl-2-lactylate, are also useful.

Preferably, the emulsifier is any one or a combination of the various alpha phase crystal-tending emulsifiers disclosed in U.S. Pats. 3,145,108 and 3,145,109 issued to Howard on Aug. 18, 1964 and in U.S. Pat. 3,145,110 issued to Abbott on Aug. 18, 1964. Examples of such alpha phase crystal-tending emulsifiers are propylene glycol monostearate, acetylated mono- or diglycerides, and lactylated mono- or diglycerides.

Another ingredient which is preferably used in conjunction with the shortening of these mixes is a high temperature batter stabilizer such as stearic acid, malic stearate, and octadecyl hydrogen succinate or any of the high temperature batter stabilizers which are disclosed in U.S. Pats. 3,145,108, 3,145,109, 3,145,110 and are also disclosed in U.S. Pat. 3,168,405 issued to Howard and Martin on Feb. 5, 1965. The high temperature batter stabilizer is preferably used in an amount of from about 0.25 to about 4.0% by weight of the shortening.

The selection of a chemical leavening system from among those known in the art poses no problem for one skilled in the formulation of culinary mixes. In general such systems are composed of baking soda, e.g., sodium, potassium, or ammonium bicarbonate, on the one hand, and one or more phosphates or other common baking acids on the other. Suitable baking acids include monocalcium phosphate, dicalcium phosphate, sodium acid pyrophosphate, potassium acid tartrate, monosodium phosphate, sodium aluminum phosphate, and sodium aluminum sulfate, among others. The amount of soda and the selected acid are so balanced as to achieve a pH in the resultant batter of about 6 to 10. Frequently, provision of a slight excess of soda is advantageous so as to assure absence of unreacted acid or to compensate for the acid tendency of some batter ingredients.

For many mixes it is accepted practice for the housewife to add eggs in the course of batter preparation and this practice can be followed just as well in the present mixes. If desired, the inclusion of egg solids in the mix is an allowable alternative. The function and permissible variations in the remaining ingredients, for example, flavor, color, hydrophilic colloids, dry milk solids, or the like, are sufficiently apparent to render the detailed explanation thereof unnecessary.

It is to be understood that a wide variety of mixes can be produced by this invention but, for purposes of illustration, a specific application to layer cake mixes (Examples I, II, III, infra) and to molasses-type cookies (Example IV, infra) will be set forth in detail. The composition of mixes processed by the method of this invention which are suitable for baking cakes, cookies or other goods can vary but representative compositions are within the following ranges:

| Ingredient: | Percent by weight of dry mix |
|---|---|
| Flour | 20–50 |
| Sugar | 20–70 |
| Shortening | 4–26 |
| Leavening agents | 0–6 |
| Egg solids | 0–5 |
| Hydrophilic colloids | 0–1 |
| Nonfat dried milk solids | 0–5 |
| Cocoa | 0–10 |
| Flavoring (including spices) | 0–10 |
| Coloring | Minor amounts |

All types of flour- and sugar-based prepared layer cake and cookie mixes can be made with the above compositions. White cakes, yellow cakes, chocolate cakes, devil's food cakes, marble cakes, spice cakes, high-ratio as well as low-ratio cakes, oatmeal cookies, chocolate-chip cookies, and many other layer cakes, cookies, and like products of excellent quality can be prepared simply by adding water to the dry mix in a single mixing step, or multiple mixing steps, followed by baking. Layer cake mixes are the preferred type of culinary mix processed by the method of this invention.

EXAMPLE I

A yellow-type dry prepared layer cake mix having the following composition was processed in the manner described below.

Composition

| Ingredient: | Percent by weight |
|---|---|
| Sugar | 43.47 |
| Flour | 40.48 |
| Shortening [1] | 11.00 |
| Nonfat milk solids | 1.50 |
| Soda | 0.90 |
| Leavening acid | 1.20 |
| Salt | 0.75 |
| Hydrophilic colloid | 0.20 |
| Flavor and dye | 0.5 |
| | 100.00 |

[1] The shortening was prepared by melting together the following and plasticizing by rapidly cooling with agitation: 87% vegetable oil comprising 82.5% soybean oil and 17.5% cottonseed oil, which had been refined, bleached, deodorized, and hydrogenated to an iodine value of about 60; 13% emulsifiers comprising 77% lactylated mono- and diglycerides and 23% rapeseed monoglyceride.

The mix was made by adding 9810 g. of crystalline sugar (industrial fine granulated sucrose) to 9170 g. of soft wheat flour and co-milling this mixture by passing it one time through an Alpine Kolloplex 250Z multi-impact mill [2] operating at 12,000 r.p.m.

The input to the multi-impact mill comprised about 52% sugar particles having diameters ranging from about 50μ to about 1000μ and a mean particle diameter of about 300μ; and about 48% flour particles having diameters ranging from about 1μ to about 130μ and a mean particle diameter of about 30μ.

The co-milled mixture obtained from the multi-impact mill comprised about 45% sugar particles having diameters ranging from about 2μ to about 60μ and a mean particle diameter of about 15μ; about 25% flour particles having diameters ranging from about 2μ to about 40μ and a mean particle diameter of about 12μ; and about 30% combined particles of sugar and flour having particle diameters ranging from about 10μ to about 80μ and having a mean particle diameter of about 25μ. The flow rate of material through the mill was about 500 lbs. per hour (50 lbs. per hour per horsepower) and the total work input to the mill was about 7 watt hours per pound of material processed.

330 grams of the shortening was mixed with 2518 grams of the co-milled sugar-fluor mixture in a paddle mixer until a homogeneous blend was formed. The proper amounts of the additional ingredients were then added to the homogeneous blend by further mixing in a paddle

[2] The Alpine Kolloplex 250Z is a specific sieveless impact stud mill which utilizes two coaxially-mounted discs having an array of studs in circumferential rows projecting therefrom and interspaced between the two discs. One disc remains stationary while the other, driven by a 10 horsepower motor, revolves at 12,000 r.p.m. The discs each have a diameter of about 9.6 in. and are spaced about 0.8 in. apart. The stationary disc contains 157 studs arranged in four concentric circles containing 56, 47, 36, and 18 studs, respectively. The studs of the outer circle have a length of 0.75 in. and the studs of the inner circles have a length of 0.62 in. The rotating disc contains 151 studs in four concentric circles containing 60, 48, 31 and 12 studs respectively, each stud having a length of 0.62 in. All studs in the mill have a diameter of 0.25 in. In this mill, co-milling comprises size-reducing crystalline sugar and flour in an impact zone of successive stages whereby particles impact with each other. Each concentric circle or row of studs represents a stage and the particles impact with each other as they are forced on their tortuous path from stage to stage.

mixer. The mixture thus formed was mildly impact milled in an Entoleter to form a smooth free-flowing dry mix.

Batter was prepared by adding 2 whole eggs and 1⅓ cups of water to 19 ounces (540 grams) of the mix. After mixing for two minutes at medium speed (450 r.p.m.) on a conventional household electric mixer, two 8-inch round cake pans were each filled with 468 grams of batter and then baked in an oven at 350° F. for about 30 minutes. The cake, comprised of a layer from each pan, was evaluated and data relating thereto are recorded in Table 1 below. The cake was found to be excellent in all respects.

In the above example, substantially equivalent results are observed in the processing of smooth, free-flowing mixes suitable for the preparation of excellent cakes when the sieveless impact stud mill of the example is replaced with another multi-impact mill, e.g., the multi-pass impact mills described in U.S. Pats. 3,082,962 and 3,184,172 and similar multi-pass impact mills; jet mills; or the multi-stage impact mills disclosed in U.S. Pats. 2,752,097, 2,875,956, and 3,067,959 and similar multi-stage impact mills. In the multi-pass impact mills, co-milling comprises size reducing crystalline sugar and flour in an impact zone and recycling oversized particles to the impact zone whereby particles impact with each other. In the multi-stage impact mills, co-milling comprises size-reducing crystalline sugar and flour in an impact zone of successive stages whereby particles impact with each other.

For comparative purposes, two additional cake mixes corresponding in composition to the mix of Example I were prepared.

The first comparative mix was prepared exactly as the mix of Example I except that the flour and sugar were passed through the multi-impact mill separately and then mixed together in a paddle mixer. A cake was prepared from the mix in a manner identical to that shown in Example I. The cake was evaluated and data are recorded in Table 1 below.

In the second comparative mix, sugar, flour and shortening were admixed and passed through a 3-roll mill. The remaining ingredients were added and the mixture was subjected to mild impact grinding, all in accordance with the teachings of U.S. Patent 2,874,053. A cake was prepared from the mix in a manner identical to that shown in Example I. The cake was evaluated and data are recorded in Table 1 below.

TABLE 1

| Cake | Center height | Edge height | Grain grade | Holes and tunnels grade | Crust appearance | Eating quality |
|---|---|---|---|---|---|---|
| Example I (co-milled) | 2.43 | 2.02 | 8.0 | 9.0 | Sl. wrinkled | Mod. moist, mod. tender, sl. gummy. |
| First comparative mix (flour and sugar impact milled sepatately) | 2.27 | 1.82 | 7.5 | 8.75 | do | Sl. dry, sl. tough. |
| Second comparative mix (roll-milled) | 2.41 | 2.02 | 8.0 | 9.0 | do | Mod. moist, mod. tender, sl. gummy. |

For purposes of the above-recorded evaluations and those appearing in Tables 2 and 3, infra, the height represents one layer and was determined at the center and at the edge or periphery of each layer while the layers were still hot, i.e., within 30 seconds after removal from the oven. A cut face of the layers was examined visually and graded as to grain characteristics and as to "holes and tunnels." In each case, the grading was between 1 and 10 wherein 1 is poor and 10 is excellent. The term "holes and tunnels" refers to the voids or pockets that often emerge in layer cakes during baking due to coalescence of a number of small air bubbles in the batter into large pockets. The grade for this characteristic is, therefore, an indication of the uniform air retention capabilities of the batter.

EXAMPLE II

A white-type dry prepared layer cake mix having the following composition was processed in the manner described below:

Composition

| Ingredient: | Percent by weight |
|---|---|
| Sugar | 40.75 |
| Flour | 40.82 |
| Shortening [1] | 9.50 |
| Nonfat milk solids | 2.00 |
| Wheat starch | 4.00 |
| Soda | 0.80 |
| Leavening acid | 1.08 |
| Salt | 0.75 |
| Flavor | 0.30 |
|  | 100.00 |

[1] The shortening was prepared by melting together the following and plasticizing by rapidly cooling with agitation:
89% shortening comprising 85% tallow, 10% soybean oil, and 5% cottonseed oil which had been refined, bleached, deodorized and hydrogenated to an iodine value of about 60;
11% emulsifier comprising propylene glycol monostearate.

The mix was made by adding 3675 g. of crystalline sugar (industrial fine granulated sucrose) to 4082 g. of soft wheat cake flour and co-milling the mixture by passing it one time through an Alpine Kolloplex 250Z multi-impact mill operating at 12,000 r.p.m.

The impact milling conditions and the particle composition and size distribution of the input to the mill were essentially the same as in Example I. Also, the co-milled mixture obtained from the multi-impact mill had essentially the same particle composition and size distribution as in Example I.

285 g. of the shortening was mixed with 2325 g. of the co-milled sugar-flour mixture in a paddle mixer until a homogeneous blend was formed. The proper amounts of the additional ingredients were then added to the homogeneous blend by further mixing in a paddle mixer. The mixture thus formed was mildly impact milled in an Entoleter to form a smooth free-flowing dry mix.

Batter was prepared by adding the whites of two eggs and 1⅓ cups of water to 19 ounces (540 g.) of the mix. After mixing for two minutes at high speed (875 r.p.m.) and one minute at medium speed (450 r.p.m.) on a conventional household electric mixer, two 8-inch round cake pans were each filled with 450 g. of batter and then baked in an oven at 350° F. for about 27 minutes. The cake, comprised of a layer from each pan, was evaluated and data relating thereto are recorded in Table 2 below. The cake was found to be excellent in all respects.

In this example, substantially equivalent results are achieved in the processing of smooth, free-flowing mixes suitable for the preparation of excellent cakes when the multistage sieveless impact stud mill of the example is replaced with a multi-pass vertical air-swept mill in which co-milling comprises size reducing crystalline sugar and flour in an impact zone and recycling oversized particles to the impact zone whereby particles impact with each other.

For comparative purposes, two additional cake mixes, corresponding in composition to the mix of Example II, were prepared.

The first comparative mix was prepared exactly as the mix of Example II except that the flour and sugar were passed through the multi-impact mill separately and then mixed together in a paddle mixer. A cake was prepared from the mix in a manner identical to that shown in Example II. The cake was evaluated and data are recorded in Table 2 below.

In the second comparative mix, sugar, flour and shortening were admixed and passed through a 3-roll mill. The remaining ingredients were added and the mixture was subjected to mild impact grinding, all in accordance with the teachings of U.S. Pat. 2,874,053. A cake was prepared from the mix in a manner identical to that shown in Example II. The cake was evaluated and data are recorded in Table 2 below.

TABLE 2

| Cake | Center height | Edge height | Grain grade | Holes and tunnels grade | Crust appearance | Eating quality |
|---|---|---|---|---|---|---|
| Example II (co-milled) | 2.30 | 1.68 | 8.50 | 9.00 | Smooth and golden. | Mod. moist, mod. tender, mod. gummy. |
| First comparative mix (flour and sugar impact milled separately). | 2.24 | 1.62 | 8.50 | 9.00 | Smooth with slight ring. | Slightly moist, slightly/mod. tender, mod. gummy. |
| Second comparative mix (roll-milled) | 2.28 | 1.72 | 8.50 | 9.00 | Smooth and golden. | Mod. moist, mod. tender, mod. gummy. |

EXAMPLE III

A devil's food-type dry prepared layer cake mix having the following composition was processed in the manner described below.

Composition

| Ingredient: | Percent by weight |
|---|---|
| Sugar | 44.41 |
| Flour | 30.42 |
| Shortening [1] | 11.00 |
| Cocoa | 6.00 |
| Nonfat milk solids | 1.00 |
| Soda | 2.20 |
| Leavening acid | 0.25 |
| Cornstarch | 3.50 |
| Hydrophilic colloid | 0.05 |
| Salt | 1.00 |
| Flavor | 0.17 |
|  | 100.00 |

[1] The shortening was prepared by melting together the following and plasticizing by rapidly cooling with agitation:
91% shortening comprising 85% tallow, 10% soybean oil and 5% cottonseed oil which had been refined, bleached, deodorized and hydrogenated to an iodine value of about 60;
9% emulsifiers comprising 4% propylene glycol monostearate and 5% rapeseed monoglyceride.

The mix was made by adding 4441 g. of crystalline sugar (industrial fine granulated sucrose and dextrose) to 3042 g. of soft wheat cake flour and co-milling the mixture by passing it one time through an Alpine Kolloplex 250Z multi-impact mill operating at 12,000 r.p.m.

The impact milling conditions and the particle size distribution of the input to the mill were essentially the same as in Example I. In this example, the co-milled mixture obtained from the multi-impact mill comprised 50% sugar particles, 20% flour particles, and 30% combined sugar-flour particles having the same particle size distribution as in Example I.

330 g. of shortening was mixed with 2245 g. of the co-milled sugar-flour mixture in a paddle mixer until a homogeneous blend was formed. The proper amounts of the additional ingredients were then added to the homogeneous blend by further mixing in a paddle mixer. The mixture thus formed was mildly impact milled in an Entoleter to form a smooth free-flowing dry mix.

Batter was prepared by adding two whole eggs and 1½ cups of water to 19 ounces (540 g.) of the mix. After mixing for two minutes at medium speed (450 r.p.m.) on a conventional household electric mixer, two 8-inch round cake pans were each filled with 488 g. of batter and then baked in an oven at 350° F. for about 36 minutes. The cake, comprised of a layer from each pan, was evaluated and data relating thereto are recorded in Table 3 below. The cake was found to be excellent in all respects.

For comparative purposes, two additional cake mixes, corresponding in composition to the mix of Example III, were prepared.

The first comparative mix was prepared exactly as the mix of Example III except that the flour and sugar were passed through the multi-impact mill separately and then mixed together in a paddle mixer. A cake was prepared from the mix in a manner identical to that shown in Example III. The cake was evaluated and data are recorded in Table 3 below.

In the second comparative mix, sugar, flour and shortening were admixed and passed through a 3-roll mill. The remaining ingredients were added and the mixture was subjected to mild impact grinding, all in accordance with the teachings of U.S. Patent 2,874,053. A cake was prepared from the mix in a manner identical to that shown in Example III. The cake was evaluated and data are recorded in Table 3 below.

The mix was made by adding 3400 g. of granular sugar to 3700 g. of cake flour and co-milling this mixture by passing it one time through an Alpine Kolloplex 250Z multi-impact mill operating at 12,000 r.p.m. The impact milling conditions and the particle size distribution of the input to the mill were essentially the same as in Example I. In this example, the co-milled mixture from the multi-impact mill comprised about 42% sugar particles, about 25% flour particles, and about 33% combined sugar-flour particles having the same particle size distribution as in Example I.

1500 g. of shortening was mixed with 4260 g. of the co-milled sugar-flour mixture by mixing in a paddle mixer until a homogeneous blend was formed and then the additional ingredients were added by further mixing in the paddle mixer to form the dry mix.

Cookie dough was prepared by taking 300 g. of the mix, adding one whole egg, and blending with a table fork until the dough was uniform. By use of a tablespoon the dough was made into approximately 1-inch diameter balls and dropped onto an ungreased cookie sheet. The cookies were baked at 375° for 12 minutes. The cookies were evaluated and found to be excellent in all respects.

I claim:

1. A process for preparing a dry, prepared culinary mix which comprises:
   (a) passing crystalline sugar and flour in the absence of shortening through a multi-impact mill which is a multi-stage sieveless impact stud mill, said mill having one stationary disc and one rotating disc, said rotating disc operating at high speeds of from 5,000 to 18,000 r.p.m., to form a co-milled mixture comprising finely ground sugar, flour, and from 20% to

TABLE 3

| Cake | Center height | Edge height | Grain grade | Holes and tunnels grade | Crust appearance | Eating quality |
|---|---|---|---|---|---|---|
| Example III (co-milled) | 2.33 | 1.85 | 8.00 | 8.50 | Shiny, glossy (typical). | Mod. moist, sl. gummy, mod. tender. |
| First comparative mix (flour and sugar impact milled separately). | 2.14 | 1.69 | 8.00 | 8.50 | Pronounced ring. | Sl./mod. moist, sl./mod. gummy, sl./mod. tender. |
| Second comparative mix (roll-milled) | 2.33 | 1.78 | 8.00 | 8.50 | Shiny, glossy (typical). | Mod. moist, sl. gummy, mod. tender. |

It is apparent from the foregoing examples that the co-milling process of the present invention provides dry prepared culinary mixes essentially equal in quality to those obtained from roll-milling a blend of sugar, flour and shortening, a preferred prior art technique for preparing such products. As noted previously, culinary products prepared by the roll-milling technique are generally considered to be superior to cakes prepared by conventional methods. It is further apparent from the foregoing examples that co-milling of sugar and flour (as contrasted to multi-impact milling of sugar and flour, individually) is essential to achieve the desired product.

EXAMPLE IV

A molasses-type cookie mix having the following composition was processed in the manner described below:

Composition

| Ingredient: | Percent by weight |
|---|---|
| Sugar | 34.0 |
| Flour | 37.0 |
| Shortening [1] | 25.0 |
| Milk solids | 0.5 |
| Salt | 1.0 |
| Soda | 0.5 |
| Dried molasses | 2.0 |
| | 100.0 |

[1] The shortening was prepared by melting together the following and plasticizing by rapidly cooling with agitation: 85% Soybean oil and 15% cottonseed oil which had been refined, bleached, deodorized and hydrogenated to an iodine value of about 60. No emulsifiers were used with this shortening.

60% of the co-milled mixture comprising combined sugar/flour particles; and (b) adding shortening to the co-milled mixture of step (a).

2. The process of claim 1 wherein the number of revolutions per minute of the rotating disc is from 12,000 to 18,000.

3. A process for preparing a dry, prepared culinary mix which comprises:
   (a) passing crystalline sugar and flour in the absence of shortening through a multi-impact mill which is a multi-stage sieveless impact stud mill, said mill having one stationary disc and one rotating disc, said rotating disc operating at high speeds of from 5,000 to 18,000 r.p.m., to form a co-milled mixture comprising finely ground sugar, flour, and from 20% to 60% of the co-milled mixture comprising combined sugar/flour particles;
   (b) adding shortening to the co-milled mixture of step (a) and mixing the co-milled sugar and flour and shortening to provide an essentially homogeneous sugar-flour-shortening blend; and thereafter
   (c) admixing the additional cake mix ingredients with the sugar-flour-shortening blend.

4. The process of claim 3 wherein the number of revolutions per minute of the rotating disc is from 12,000 to 18,000.

5. The process for preparing a dry prepared culinary mix which comprises,
   (a) passing crystalline sugar and flour, in the absence of shortening, through a multi-impact mill to form a co-milled mixture; said mill causing a size reduction and co-action of the sugar and flow particle by impact of particles with hard surfaces and/or with each other without undue damage to the starch portion of the flour and without the use of metal to metal contact or liquid suspensions; and (b) withdrawing the co-milled mixture from said mill, said mixture comprising finely ground sugar, and finely ground flour, wherein from 20% to 60% of the co-milled mixture comprises combined sugar/flour particles;

(c) adding shortening to the co-milled mixture of step (b).

References Cited
UNITED STATES PATENTS 3,508,928   4/1970   Ewing et al. _____ 99—94

RAYMOND N. JONES, Primary Examiner